(12) United States Patent
Metcalf et al.

(10) Patent No.: US 11,725,755 B2
(45) Date of Patent: Aug. 15, 2023

(54) CONNECTIONS OF LINED PIPE

(71) Applicant: United Pipeline Systems, Inc., Chesterfield, MO (US)

(72) Inventors: Brennan Scott Metcalf, Durango, CO (US); Ted Compton, Durango, CO (US)

(73) Assignee: United Pipeline Systems, Inc., Durango, CO (US)

( * ) Notice: Subject to any disclaimer, the term of this patent is extended or adjusted under 35 U.S.C. 154(b) by 85 days.

(21) Appl. No.: 17/083,363

(22) Filed: Oct. 29, 2020

(65) Prior Publication Data

US 2022/0136624 A1  May 5, 2022

(51) Int. Cl.
*F16L 13/02* (2006.01)

(52) U.S. Cl.
CPC ....... *F16L 13/0263* (2013.01); *F16L 13/0236* (2013.01)

(58) Field of Classification Search
CPC .. F16L 13/0263; F16L 13/0236; F16L 58/181
See application file for complete search history.

(56) References Cited

U.S. PATENT DOCUMENTS

| | | | |
|---|---|---|---|
| 3,890,483 A * | 6/1975 | Webster | B23K 9/0282 219/104 |
| 4,047,739 A | 9/1977 | Aitken | |
| 4,277,091 A * | 7/1981 | Hunter | F16L 58/181 285/55 |
| 4,640,532 A * | 2/1987 | Pope | F16L 13/0263 285/55 |
| 4,702,498 A | 10/1987 | Mueller et al. | |
| 4,793,404 A * | 12/1988 | Hata | F16L 58/187 138/143 |
| 5,127,116 A | 7/1992 | Greig | |
| 5,163,715 A * | 11/1992 | Rickard | F16L 13/0263 285/55 |
| 5,388,863 A * | 2/1995 | Omar | F16L 13/0263 285/222.1 |
| 5,566,984 A | 10/1996 | Abbema et al. | |
| 5,573,282 A | 11/1996 | Egner et al. | |
| 5,618,065 A | 4/1997 | Akiyama | |
| 6,375,226 B1 | 4/2002 | Dickinson et al. | |

(Continued)

FOREIGN PATENT DOCUMENTS

| | | | | |
|---|---|---|---|---|
| CN | 106122613 A | * | 11/2016 | |
| CN | 108799650 A | * | 11/2018 | ........... B23K 31/027 |

(Continued)

*Primary Examiner* — Zachary T Dragicevich
*Assistant Examiner* — Alexander T Rufrano
(74) *Attorney, Agent, or Firm* — Stinson LLP

(57) ABSTRACT

A welded connection kit for joining first and second lined pipes together includes a coupling sleeve to connect the first and second pipes together. The coupling sleeve has a thermal break in it. The coupling sleeve includes a first coupling member that attaches to the first pipe and a second coupling member that attaches to the second pipe. The first and second coupling members attach to each other to connect the first and second pipes. A first liner lines the first pipe and includes a first flange. A second liner lines the second pipe and includes a second flange. The first and second coupling members compress the first and second flanges together to form a fluid seal.

18 Claims, 4 Drawing Sheets

(56) References Cited

U.S. PATENT DOCUMENTS

| | | |
|---|---|---|
| 6,478,338 B1 | 11/2002 | Dalmolen et al. |
| 8,714,597 B2 | 5/2014 | Venable et al. |
| 8,794,675 B2 | 8/2014 | Baylot et al. |
| 9,915,383 B2 | 3/2018 | Compton et al. |
| 2013/0292936 A1* | 11/2013 | Rosen .................... F16L 13/02 228/101 |
| 2015/0027581 A1 | 1/2015 | Bouey et al. |
| 2015/0059911 A1 | 3/2015 | Petrov |

FOREIGN PATENT DOCUMENTS

| | | |
|---|---|---|
| EP | 45629 | 12/1984 |
| FR | 1210063 A * | 3/1960 |
| FR | 1431797 A * | 3/1966 |
| GB | 386014 | 1/1933 |
| GB | 1305516 | 2/1973 |
| GB | 1480061 | 7/1977 |
| JP | 59159294 | 9/1984 |
| KR | 20120017105 | 2/2012 |
| KR | 20120119653 | 10/2012 |
| RU | 2626709 | 7/2017 |
| WO | 2004106038 | 12/2004 |
| WO | 2011042732 A1 | 4/2011 |
| WO | 2012095633 A2 | 7/2012 |

\* cited by examiner

CONNECTIONS OF LINED PIPE

FIELD

The present disclosure generally relates to pipe connections. In particular, the present disclosure relates to welded connections of lined pipes.

BACKGROUND

This disclosure relates to connections and methods for connecting lined pipe(s). A variety of circumstances exist in which it is desirable to line a pipeline. For example, pipelines such as those used in the mining, chemical, and oil and gas industries may carry fluids at high pressure and which subject the pipeline to abrasion and corrosion. A liner may be provided inside the pipeline to protect the pipeline or to rehabilitate the pipeline.

SUMMARY

In one aspect of the present invention, a welded connection kit for joining first and second lined pipes together, the connection generally comprises a coupling sleeve configured to connect the first and second pipes. The coupling sleeve includes a heat transfer break therein, as well as a first coupling member configured to be attached to the first pipe and a second coupling member configured to be attached to the second pipe. The first and second coupling members are configured to be welded together to connect the first and second pipes. A first liner configured to line the first pipe includes a first flange. A second liner configured to line the second pipe includes a second flange. The coupling sleeve is configured to define a recess sized and shaped to receive the first flange of the first liner and the second flange of the second liner and compress the first and second flanges together to form a seal therebetween when the first and second liners line the respective first and second pipes and the first and second flanges are received in the coupling sleeve recess.

In another aspect, a coupling device for joining first and second lined pipes together comprises a first coupling member configured for sealing connection with the first pipe at a first end of the first coupling member. A second coupling member is configured for sealing connection with the second pipe at a first end of the second coupling member. The first and second coupling members are configured for welded connection to each other at respective second ends of the first and second coupling members. A heat transfer break void is defined entirely within the coupling device.

In another aspect, a method of connecting lined pipes together comprises welding a first end of a first coupling member to a first pipe, and welding a first end of a second coupling member to a second pipe. The first pipe is lined with a first liner so that a portion of the first liner protrudes from an end of the first pipe and has a first flange received in a recess of the first coupling member. The second pipe is lined with a second liner so that a portion of the second liner protrudes from an end of the second pipe and has a second flange received in a recess of the second coupling member. Second ends of the first and second coupling members are brought together to form a heat transfer break void within the adjoined first and second coupling members and press the first and second flanges of the liner together. The second ends of the first and second coupling members are then welded together.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
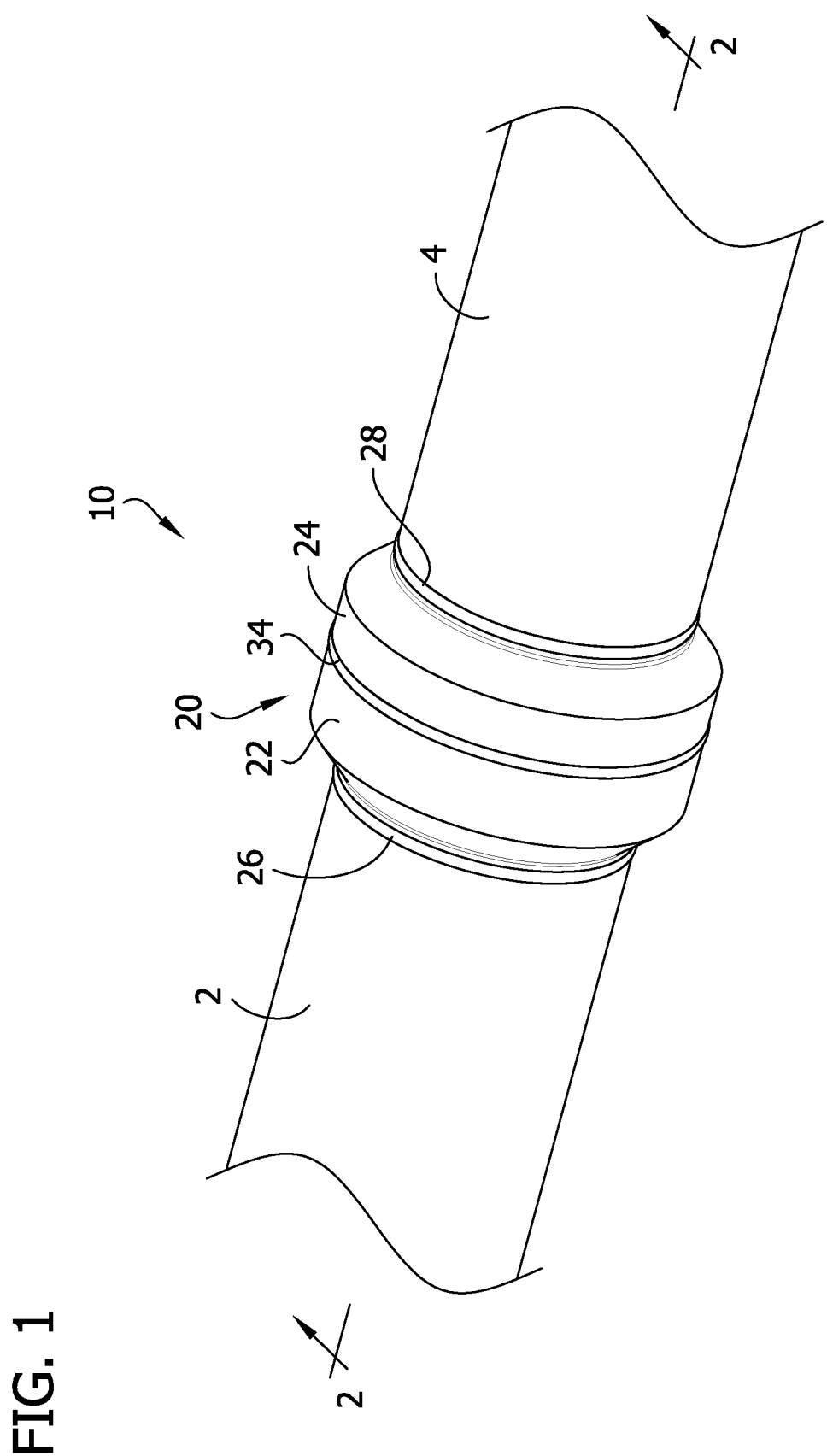
FIG. 1 is a perspective of a welded connection connecting lined pipes according to one embodiment of the present disclosure.

Liners of various types of suitable material may be used for protecting a pipeline and/or rehabilitating a pipeline. The liner provides a new internal surface or flow path for the pipeline. For example, in a diameter reduction lining operation, a liner having an outside diameter slightly larger than the inside diameter of the pipeline to be lined is temporarily reduced in diameter for insertion into the pipeline. The liner expands to a tight fit following insertion into the pipeline.

Connections and methods of the present disclosure may be used for connecting lined pipes, such as pipes lined with liners installed using the diameter reduction method. Lined pipe connections according to the present disclosure may include pipes lined with various liner materials, such as high density polyethylene (HDPE), polyethylene (PE), cross linked polyethylene, polypropylene (PP), polyamide (PA), nylon, polyetheretherketone (PEEK). Moreover, methods other than diameter reduction may be used to install the liners. For example, any pull-in method, such as slip-fit installation, may be used without departing from the scope of the present disclosure.

Referring to FIGS. 1-4, one embodiment of a welded pipe connection (e.g., a lined pipe connection) according to the present disclosure is generally indicated at reference numeral 10. The component parts of the welded connection 10 may also be referred to as a kit. The welded connection 10 connects adjacent lined pipes (e.g., first and second pipes) 2, 4. The first and second pipes 2, 4 may be steel pipes. Liners (e.g., first and second liners) 12, 14 line the respective first and second pipes 2, 4. The liners 12, 14 are generally identical, with each liner including a tubular section that is sized and shaped to be inserted into the lumen of the pipe 2, 4 to line the interior surface of the pipe. Each liner 12, 14 also includes a flange (e.g., a sealing flange) (broadly, an external structure). The first liner 12 includes a first flange 16 and the second liner 14 includes a second flange 18. The flange 16, 18 of each liner 12, 14 is disposed at an end of the liner. As described in more detail below, the first and second flanges 16, 18 facilitate the formation of a seal (e.g., a fluid-tight seal) between the liners 12, 14 and therefore the first and second pipes 2, 4, when the pipes are connected using the welded connection 10. The liners 12, 14 can be made out of any suitable material. In one embodiment, the liners 12, 14 may be considered part of the welded connection 10.

In one embodiment, the liners 12, 14 may be liner sections (e.g., stub ends) that are separate from the rest of the liners that line the pipes 2, 4. The liner sections may be formed out of the same material as the liners and connected (e.g., fused)

to the liners when the connection between the first and second pipes 2, 4 is being made.

The welded connection 10 includes a coupling device 20 for connecting (e.g., attaching, joining) the first and second pipes 2, 4. In the illustrated embodiment, the coupling device 20 is a coupling sleeve. The coupling sleeve 20 is generally tubular and defines a lumen extending between and fluidly coupling the first and second pipes 2, 4 together. The coupling sleeve 20 is generally disposed between the first and second pipes 2, 4. Accordingly, adjacent ends of the first and second pipes 2, 4 are spaced apart. The spacing may have been initially created by cutting a single pipe to provide access to the interior pipe for lining. The coupling sleeve 20 includes first and second coupling members or hubs 22, 24. The first and second coupling members 22, 24 are each tubular, and in the illustrated embodiment formed as a single piece of weldable material. The first coupling member 22 is configured to be attached to the first pipe 2 and the second coupling member 24 is configured to be attached to the second pipe 4. The first and second coupling members 22, 24 form a sealing connection with the respective first and second pipes 2, 4. In the illustrated embodiment, ends (e.g., second ends) of the first and second coupling members 22, 24 are attached to the ends of the respective first and second pipes 2, 4, by respective welds 26, 28 (e.g., girth or circumferential welds). The present invention has particular application as a welded connection. Other ways of attaching the first and second coupling members 22, 24 to the pipes 2, 4 are within the scope of the present disclosure. For example, in other embodiments, the first and second coupling members may overlap a portion of the respective first and second pipes. The first and second coupling members 22, 24 may be formed of various suitable materials, such as steel.

The first and second coupling members 22, 24 are configured to be attached together to connect the first and second pipes 2, 4. The first coupling member 22 includes an end 30 (e.g., a first end) that engages with an end 32 (e.g., a first end) of the second coupling member 22. In the illustrated embodiment, the first and second coupling members 22, 24 (e.g., ends 30, 32 thereof) are attached together by a weld 34 (e.g., a girth or circumferential weld). In other words, the first and second coupling members 22, 24 are configured to be welded together at a juncture J between the first and second coupling members. The juncture J (e.g., weld 34) is located at the exterior surface of the coupling sleeve 20 and extends circumferentially around the coupling sleeve. Other ways of attached the first and second coupling members 22, 24 together are within the scope of the present disclosure. As shown, the first and second coupling members 22, 24 are concentrically aligned when they are attached together. In the illustrated embodiment, the first and second coupling members 22, 24 each include a concentric aligner 36, 38. The concentric aligners 36, 38 facilitate the concentric alignment of the first and second coupling members 22, 24 when the first and second coupling members (e.g., ends 30, 32 thereof) are brought together. The concentric aligners 36, 38 are configured to mate with one another when the first and second coupling members 22, 24 are attached together to concentrically align the first and second coupling members. In the illustrated embodiment, the concentric aligners 36, 38 each comprise a surface (e.g. alignment surface) disposed at an angle to a longitudinal axis of the coupling sleeve lumen, and extending around the full circumference of the coupling member 22, 24. For example, the angle of the alignment surfaces 36, 38 may be about 45 degrees, with respect to the longitudinal axis, although other values (e.g., more or less than 45 degrees) are within the scope of the present disclosure. The alignment surfaces 36, 38 engage one another as the ends 30, 32 of the first and second coupling members 22, 24 are brought into abutment to automatically concentrically align the coupling members. Other configurations of the concentric aligners 36, 38 are within the scope of the present disclosure.

Figure 2:
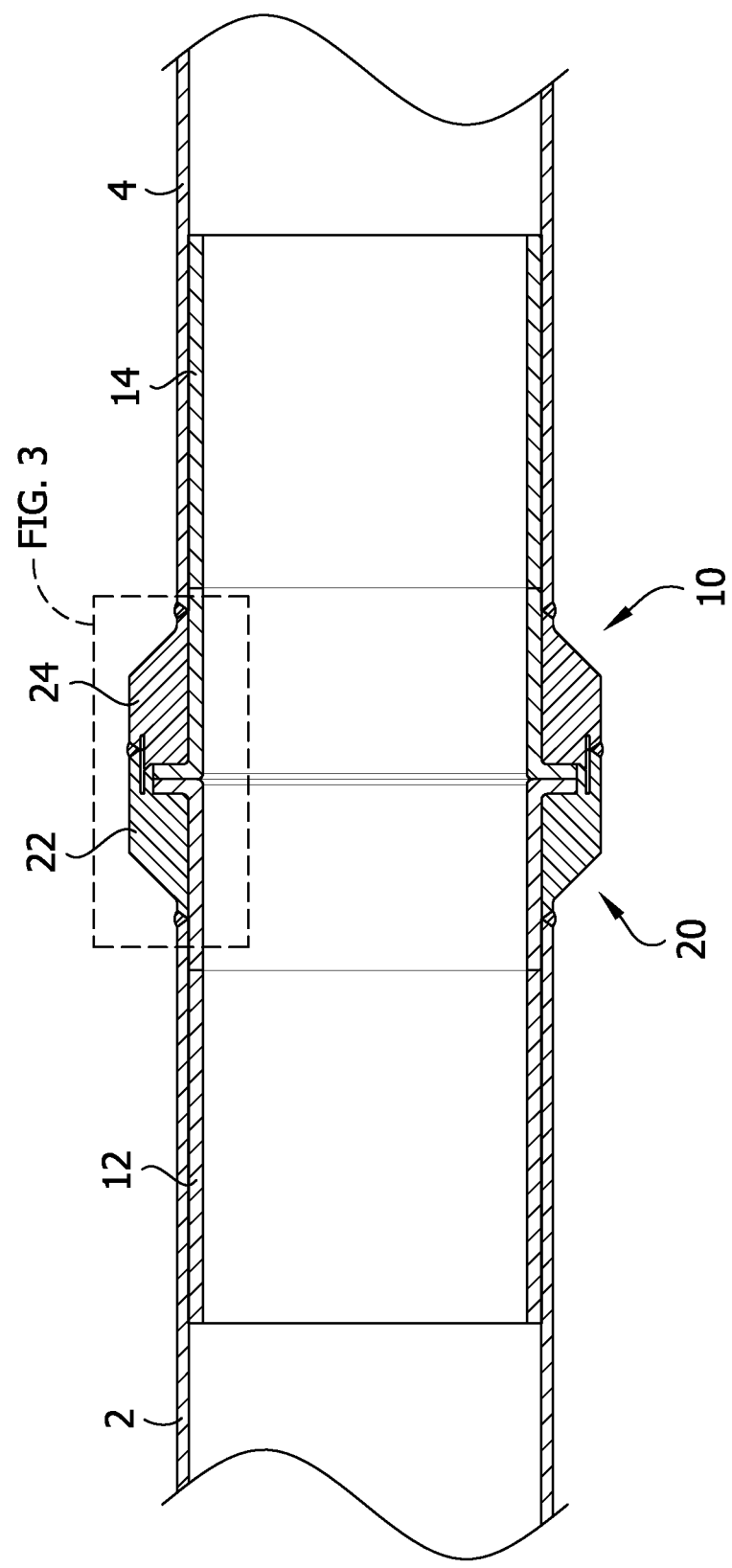
FIG. 2 is a section of the welded connection taken through line 2-2 of FIG. 1.
Figure 3:
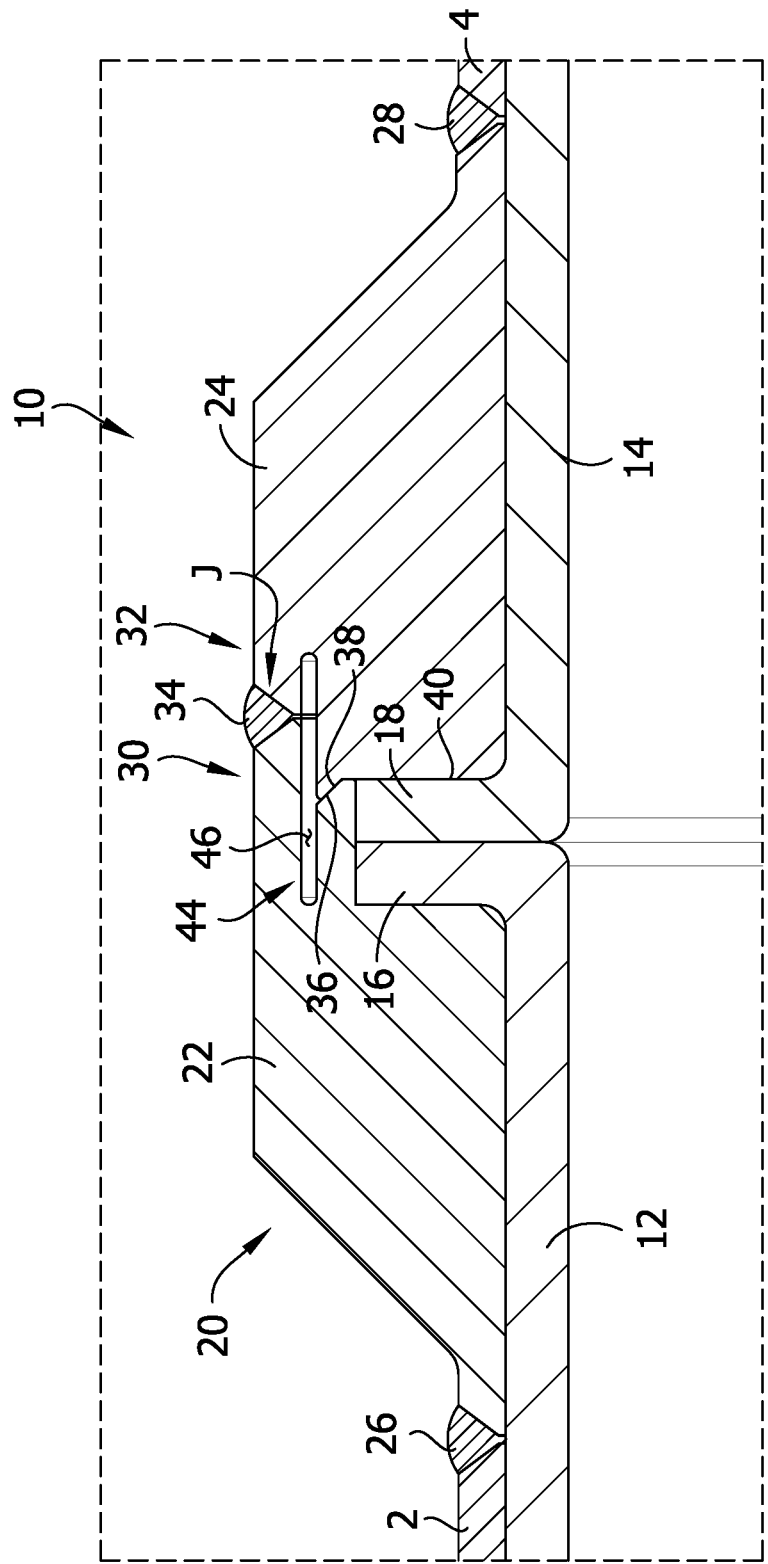
FIG. 3 is an enlarged fragment of the section of FIG. 2.
Figure 4:
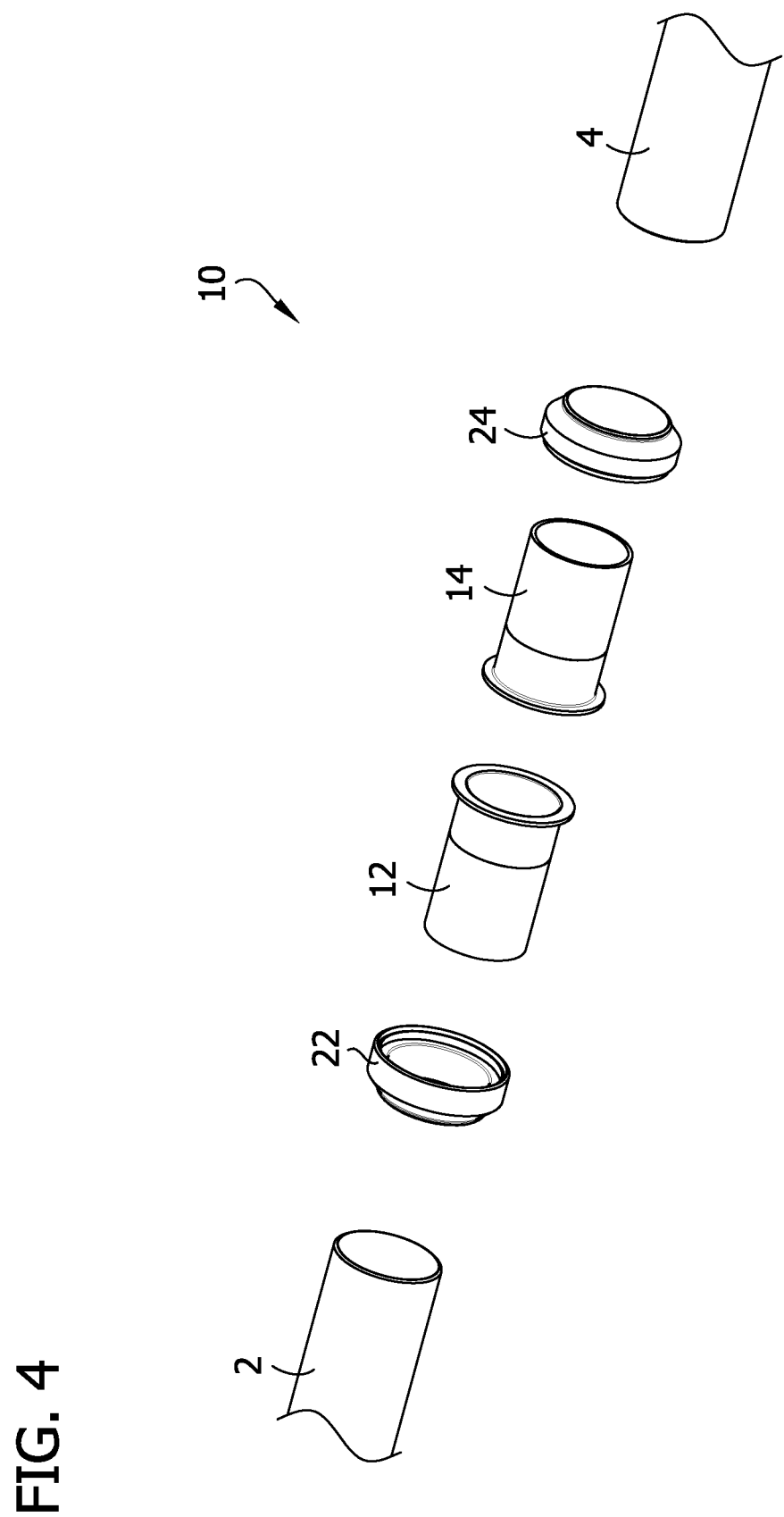
FIG. 4 is an exploded perspective of the welded pipe connection.

Referring to FIGS. 2 and 3, the coupling sleeve 20 includes internal structure for forming the seal between the first and second liners 12, 14. The internal structure of the coupling sleeve 20 corresponds to the external structures of the first and second liners 12, 14. Specifically, the coupling sleeve receives the first and second flanges 16, 18 of the first and second liners 12, 14. The coupling sleeve 20 is configured to engage the first flange 16 of the first liner 12 and the second flange 18 of the second liner 14. In the illustrated embodiment, the internal structure is a recess 40 sized and shaped to receive the first and second flanges 16, 18. The first and second coupling members 22, 24 each define a portion of the recess 40 (broadly, first and second coupling members each define a recess) for receiving the first and second flanges. Specifically, the recess 40 is an internal, circumferential slot. The slot 40 extends generally radially outward from an inner surface of the coupling sleeve 20. The slot 40 is defined by opposite side surfaces and a base, with a mouth opening radially inwardly into the coupling sleeve lumen. The slot 40 is sized and shaped to receive the first and second flanges 16, 18 of the first and second liners 12, 14. Specifically, the slot 40 is sized and shaped to compress the first and second flanges 16, 18 together to form the seal therebetween. When the connection is formed, the first and second liners 12, 14 are disposed in the coupling sleeve lumen and the first and second flanges 16, 18 are disposed in the slot 40. The side surfaces defining the slot 40 act as "stops" for securing the first and second liners 12, 14 in position. Each side surface of the slot 40 engages one of the first or second flanges 16, 18. This engagement between the coupling sleeve 20 and the first and second flanges 16, 18, in addition to compressing the flanges together, also inhibits longitudinal movement (e.g., movement generally parallel to the longitudinal axis) of the first and second liners 12, 14 relative to the first and second pipes 2, 4. This prevents the first and second flanges 16, 18 from moving away from one another and breaking the seal therebetween. In the illustrated embodiment, the slot 40 is defined by both the first and second coupling members 22, 24. Thus, the first and second flanges 16, 18 of the liners 12, 14 are generally compressed between the first and second coupling members 22, 24 (e.g., the ends 30, 32 thereof). The amount of compression can be controlled by consistently sizing the width of the slot 40. In the illustrated embodiment, the width of the slot is set by the engagement of the coupling members 22, 24. The concentric aligners 36, 38 help to make sure the coupling sleeves 22, 24 always engage it other at the same location. The coupling sleeves 22, 24 can be accurately machined so that when they engage each other at the selected location, the width of the slot 40 can be precisely set to achieve sufficient compression to seal against high pressure liquid, but not so tightly as to damage the first and second liner flanges 16, 18. Other configurations of the internal structure (e.g., slot 40) are within the scope of the present disclosure.

The coupling sleeve 20 may include heat transfer or thermal break 44 for protecting the liners 12, 14 (e.g., first and second flanges 16, 18) from heat generated during the welding (e.g., formation of weld 34) of the first and second coupling members 22, 24 together. The heat transfer break 44 is configured to limit the amount of heat that reaches the first and second flanges 16, 18 when the first and second coupling members 22, 24 are welded together so as to prevent damage to the liners 12, 14. The heat transfer break 44 extends circumferentially around the coupling sleeve 20. The heat transfer break 44 is arranged to underlie the outer surfaces of the connected ends 30, 32 of the first and second coupling members 22, 24. The heat transfer break 44 is disposed between the juncture J (e.g., weld 34) of the first and second coupling members 22, 24 and the slot 40 (e.g., first and second flanges 16, 18). Accordingly, the heat transfer break 44 breaks up a direct conductive heat path extending between the weld 34 and the first and second flanges 16, 18. In the illustrated embodiment, the heat transfer break 44 comprises a thermal control void or cavity 46 (e.g., air gap) that extends around the full circumference of the coupling members 22, 24. The thermal control void 46 is defined (e.g., entirely defined) by the coupling sleeve 20. In the illustrated embodiment, the thermal control void 46 is cooperatively defined by the first and second coupling members 22, 24. The thermal control void 46 includes a first portion in the first coupling member 22 and a second portion in the second coupling member 24. The portion of the thermal control void 46 defined by each of the first and second coupling members 22, 24 is generally a slot extending, generally parallel to the longitudinal axis, into the respective coupling member from the end 30, 32 thereof. The first and second portions of thermal control void 46 are positioned so that when the first and second coupling members 22, 24 are connected together by welding (FIG. 3), the first and second portions cooperate to form the heat transfer break void. When the ends 30, 32 of the first and second coupling members 22, 24 are abutted together, the first and second portions are aligned and form the thermal control void 46. Other configurations of the heat transfer break 44 are within the scope of the present disclosure. For example, the heat transfer break may comprise thermally insulating material.

Still referring to FIG. 3, in the illustrated embodiment, the ends 30, 32 of the first and second coupling members 22, 24 are offset from the center of the heat transfer break 44 when the first and second coupling members are connected together by welding. In particular, the juncture J between the first and second coupling members 22, 24 is offset (e.g., longitudinally offset) from a center of the heat transfer break 44. Moreover, the juncture J between the first and second coupling members 22, 24 is offset from the slot 40, and from the first and second flanges 16, 18. Accordingly, to better position the heat transfer break 44 between the juncture J (e.g., weld 34) and the slot 40, the heat transfer break (e.g., the center thereof) is offset from the slot (e.g., a center thereof). Having the juncture J offset from the slot 40, increases the distance between the weld 34 and the first and second flanges 16, 18 to reduce the amount of heat from the welding that may reach the first and second flanges. The heat used for form the weld 34 can damage (e.g., melt, burn, etc.) the liners 12, 14 (e.g., first and second flanges), causing a loss of liner integrity. Due to the juncture J being offset from the slot 40, portions of the first and second coupling members 22, 24 overlie one another, as shown in FIG. 3, when the first and second coupling members are coupled together. The present welded connection 10 does not rely on fusing the liners 12, 14 together, instead the connection compresses the flanges 16, 18 of the liners together to form a reliable seal.

The juncture J extends radially inwardly from a V-groove on the exterior surface of the coupling members 22, 24 where the weld 34 is formed. The juncture J extends down from the V-groove to the void 46 so that the void is in part closed by the girth weld 34. At a location offset from the part of the juncture J that intersects the void 46 from the V-groove, the juncture continues at an angle and includes in this segment the concentric aligners 36, 38. The juncture J then turns back to a radial path to its intersection with the recess 40. In the illustrated embodiment, the coupling member 22 forms the entirety of the base of the recess 40. The coupling member 24 defines only one side surface of the recess 40. It will be appreciated that other configurations of the juncture J and recess 40 are possible within the scope of the present invention.

Referring to FIG. 3, the seal between the first and second flanges 16, 18 of the first and second liners 12, 14 is formed entirely by compression of the flanges against each other by the coupling sleeve 20. It will be understood that additional sealing material (not shown) may be used between the flanges within the scope of the present invention. The constriction of the first and second flanges 16, 18 in the recess 40 is important to maintaining the seal. The base of the recess 40, located at the radially outermost extent of the recess, prevents the material of the first and second flanges 16, 18 from being extruded outwardly (sometimes referred to as "cold flow") either by the force of the compression, or by the pressure applied by liquids transported within the first and second liners 12, 14.

In one method of coupling the lined pipes 2, 4 using welded connection 10, the first and second coupling members 22, 24 are first joined (e.g., welded) to the respective first and second pipes. The first end of the first coupling member 22 is welded (by forming girth weld 26) to the end of the first pipe 2. Likewise, the first end of the second coupling member 24 is welded (by forming girth weld 28) to the end of the second pipe 4. In many instances the coupling members 22, 24 are installed well in advance of lining the pipes. Lining may be subsequently carried out in any suitable manner, such as by rolling down the diameter of the first and second liners 12, 14 and pulling them into the respective first and second pipes 2, 4 under tension. After lining is complete, an end of the first liner 12 lining the first pipe 2 is pulled out of the first pipe and a flanged stub end is fused to the liner 12, thereby becoming part of the liner. It is also possible to form the first flange by reforming the liner 12 in the field, but in the illustrated embodiment a stub end is employed. The first liner 12 is released so that the first flange 16 is received in the portion of the recess 40 defined by the first coupling member 22. Likewise, the end of the second liner 14 lining the second pipe 4 is pulled out of the pipe and a flanged stub end is fused to the liner, thereby becoming part of the liner. Again, it is possible to form the second flange 18 in the field through reformation of the second pipe 4, but here a stub end is fused to the second liner 14. The second liner is released so that the second flange 18 is received against a surface of the second coupling member 24 defining another portion of the recess 40.

The first and second coupling members 22, 24 are then brought together using appropriate equipment and/or machinery (not shown). The first and second coupling members 22, 24 press the first and second flanges 16, 18 together to form a thermoplastic seal. Bringing the first and second coupling members 22, 24 together also forms the heat transfer break 44 (e.g., thermal control void 46) within the adjoining first and second coupling members. The first and second coupling members 22, 24 (e.g., ends 30, 32) are then joined together, such as by forming the girth weld 34. Cooling jackets (not shown) known in the art may be applied to the coupling members 22, 24 to work in conjunction with the heat transfer break 44 in the coupling members to inhibit the liners 12, 14 from being overheated and damaged. The heat transfer break 44 retards propagation of heat through the coupling members 22, 24 toward the first and second flanges 16, 18.

The recess 40 has a width that is precisely controlled by the engagement of the coupling members 22, 24 aided by the alignment surfaces 36, 38. The controlled width of the recess provides consistent compression of the first and second flanges 16, 18. The enclosure provided by the recess 40 on the radially outward side inhibits cold flow of the material of the material of the first and second flanges under compression and due to fluid pressure from the liquid passing through the pipes 2, 4. The completed welded connection 10 provides a leak-proof, inert fluid path. The first and second liners 12, 14 provide the connection 10 with a generally constant inside diameter. Thus, the diameter of the flow path from pipe 2 to pipe 4 across the connection 10 is generally constant. This construction is beneficial because it provides a flow path along the connection 10 that is bounded substantially continuously by abrasion-resistant liners 12, 14.

Having described the disclosure in detail, it will be apparent that modifications and variations are possible without departing from the scope of the disclosure defined in the appended claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products without departing from the scope of the disclosure, it is intended that all matter contained in the above description and shown in the accompanying drawings shall be interpreted as illustrative and not in a limiting sense.

What is claimed is:

1. A welded connection kit for joining first and second lined pipes together, the connection comprising:
    a coupling sleeve configured to connect the first and second pipes, the coupling sleeve including a heat transfer break therein, the coupling sleeve further including a first coupling member configured to be attached to the first pipe and a second coupling member configured to be attached to the second pipe, the first and second coupling members being formed for welded connection to each other at a weld location to connect the first and second pipes;
    a first liner configured to line the first pipe, the first liner including a first flange;
    a second liner configured to line the second pipe, the second liner including a second flange; and
    the coupling sleeve being configured to define a recess sized and shaped to receive the first flange of the first liner and the second flange of the second liner and compress the first and second flanges together to form a seal therebetween when the first and second liners line the respective first and second pipes and the first and second flanges are received in the recess of the coupling sleeve;
    wherein the weld location of the first and second coupling members is longitudinally offset from a longitudinal center of the heat transfer break when the first and second coupling members are joined together.

2. The welded connection kit of claim 1, wherein the coupling sleeve is configured to engage radially outward surfaces of the first and second flanges when received in the recess to prevent movement of material of the first and second flanges in a radially outward direction.

3. The welded connection kit of claim 1, wherein the coupling sleeve is configured to engage the first flange of the first liner and second flange of the second liner when received in the recess to inhibit longitudinal movement of the first and second liners relative to the first and second pipes.

4. The welded connection kit of claim 1, wherein the recess is cooperatively defined by the first and second coupling members.

5. The welded connection kit of claim 4, wherein the recess has a width that is set by engagement of the first coupling member with the second coupling member.

6. The welded connection kit of claim 1, wherein the heat transfer break is disposed between the weld location of the first and second coupling members and the recess configured to receive the first and second flanges of the first and second liners for limiting the amount of heat that reaches the first and second flanges when the first and second coupling members are welded together.

7. The welded connection kit of claim 6, wherein the heat transfer break comprises a thermal control void.

8. The welded connection kit of claim 6, wherein the thermal control void is defined by the coupling sleeve.

9. The welded connection kit of claim 8, wherein the first and second coupling members cooperatively define the thermal control void.

10. The welded connection kit of claim 1, wherein the heat transfer break comprises a thermal control void having a center, the weld location of the first and second coupling members being longitudinally offset from the center of the thermal control void.

11. The welded connection kit of claim 1, wherein the first and second coupling members each include a concentric aligner, the concentric aligners configured to engage one another when the first and second coupling members are attached together to concentrically align the first and second coupling members as the first and second coupling members are brought together.

12. The welded connection kit of claim 11, wherein the recess of the first and second coupling members has a width and the width is set by engagement of the concentric aligners of the first and second coupling members.

13. The welded connection kit of claim 1, in combination with the first and second pipes, wherein the coupling sleeve is attached to the first and second pipes.

14. A coupling device for joining first and second lined pipes together, the coupling device comprising:
    a first coupling member configured for sealing connection with the first pipe at a first end of the first coupling member;
    a second coupling member configured for sealing connection with the second pipe at a first end of the second coupling member, the first and second coupling members being formed for welded connection to each other at a weld location at respective second ends of the first and second coupling members; and
    a heat transfer break void defined entirely within the coupling device;
    wherein the first and second coupling members define a recess sized and shaped to receive a first flange of a first liner and a second flange of a second liner when the first and second coupling members are connected together, wherein the weld location at the second ends of the first and second coupling members is longitudinally offset from a longitudinal center of the recess of the first and second coupling members when the first and second coupling members are connected together;

wherein the weld location of the first and second coupling members is longitudinally offset from a longitudinal center of the heat transfer break void when the first and second coupling members are connected together.

15. The coupling device of claim 14, wherein the heat transfer break void is arranged to underlie the second ends of the first and second coupling members when the first and second coupling members are connected together by welding.

16. The coupling device of claim 15, wherein the heat transfer break void includes a first portion and a second portion, the first portion being disposed in the first coupling member and the second portion being disposed in the second coupling member, the first and second portions being positioned so that when the first and second coupling members are connected together by welding the first portion and second portion cooperate to form the heat transfer break void.

17. The welded connection kit of claim 1, wherein a longitudinal center of the recess defined by the first and second coupling members is longitudinally offset from the welded connection.

18. The welded connection kit of claim 17, wherein the longitudinal center of the recess defined by the first and second coupling members is longitudinally offset from the longitudinal center of the heat transfer break.

* * * * *